(12) United States Patent
Avetisian

(10) Patent No.: US 11,578,826 B1
(45) Date of Patent: Feb. 14, 2023

(54) PIPE CONNECTOR

(71) Applicant: Edward Avetisian, West Hills, CA (US)

(72) Inventor: Edward Avetisian, West Hills, CA (US)

( * ) Notice: Subject to any disclaimer, the term of this patent is extended or adjusted under 35 U.S.C. 154(b) by 183 days.

(21) Appl. No.: 16/657,294

(22) Filed: Oct. 18, 2019

(51) Int. Cl.
*F16L 21/08* (2006.01)
*F16L 21/03* (2006.01)

(52) U.S. Cl.
CPC ............... *F16L 21/08* (2013.01); *F16L 21/03* (2013.01)

(58) Field of Classification Search
CPC ......... F16L 21/08; F16L 21/03; F16L 37/084; F16L 37/088; F16L 37/0887; F16L 37/091; F16L 37/0915; F16L 37/092; F16L 37/0925; F16L 37/0927
USPC ........................... 285/39, 104, 308, 309, 310
See application file for complete search history.

(56) References Cited

U.S. PATENT DOCUMENTS

| | | | |
|---|---|---|---|
| 8,033,578 B2 | 10/2011 | De Wilde | |
| 8,205,915 B1 | 6/2012 | Crompton et al. | |
| 8,303,001 B2 | 11/2012 | Oh | |
| 9,217,529 B2 | 12/2015 | Crompton et al. | |
| 9,228,681 B2 | 1/2016 | Kluss | |
| 9,322,496 B1 | 4/2016 | Crompton et al. | |
| 10,072,783 B2 | 9/2018 | Gledhill et al. | |
| 2010/0001519 A1* | 1/2010 | Komolrochanaporn | F16L 37/0927 285/332.4 |
| 2010/0140922 A1* | 6/2010 | Siemens | F16L 21/08 285/24 |
| 2013/0257036 A1* | 10/2013 | Guest | F16L 37/0927 285/93 |
| 2019/0186642 A1 | 6/2019 | Burns | |

* cited by examiner

*Primary Examiner* — Aaron M Dunwoody
(74) *Attorney, Agent, or Firm* — James M. Duncan; Scanlon Duncan LLP

(57) ABSTRACT

A push fit connector system utilizes a locking sleeve which is inserted within an internal tapered section of a cylindrical housing. A pipe end inserted into the cylindrical housing is received within the locking sleeve. Withdrawal of the pipe from the cylindrical housing is prevented as the locking sleeve radially collapses as it is received within a smaller diameter of the internal tapered section.

21 Claims, 3 Drawing Sheets

PIPE CONNECTOR

BACKGROUND OF THE INVENTION

The present invention relates to fluid flow systems and connectors utilized to couple adjacent components of a fluid flow system. More particularly, the present invention provides a secure connection between adjacent components with an easy and fast push-fit connection requiring no tools. In the present invention, a fluid conveying conduit is inserted into the connector of the invention and grasped upon insertion. Embodiments of the present invention provide this connection with a minimal number of components, thereby reducing the expense of the connector and related components.

Piping connection devices are necessary to join piping and pipe fittings together, as well as connecting piping utilized for supply and/or drainage to various components. Piping fittings may include straight lengths of pipe, elbows, tees, as well as pipe reducers, swages, valves, angle connectors, etc. Piping components may include faucets, headers, pumps, manifolds, tanks, and similar devices.

In the past, pipe connections have been made by welding, soldering, threaded, or glued connections. Welding, soldering and, in the case of plastic pipe, glued connections are time consuming, labor intensive, and non-reversible. Threaded connections are not appropriate for every application, and typically require the use of pipe unions.

In an effort to overcome the disadvantages of the other known devices and methods for connecting pipe, fittings and components, push-fit devices were introduced. While a step in the right direction, the known push-fit devices can be complex, utilizing multiple parts.

SUMMARY OF THE INVENTION

Embodiments of the present invention provide a push-fit connector system having fewer components than the known systems, therefore reducing expense and simplifying the installation.

A connector system of the present invention has a cylindrical housing having an open proximate end and a distal end, with an internal tapered section disposed between the two ends. The open proximate end has an outward face. The internal tapered section has a wall which tapers from a larger diameter to a smaller diameter. While embodiments of the invention may be configured differently, in the embodiment depicted in the figures, the smaller diameter is adjacent to the open proximate end. The open proximate end has an outward face.

The connector system also utilizes a locking sleeve having an insert end and an external end. The insert end has a circumferential tab or lip. The entire locking sleeve, or at least the insert end, is fabricated from an elastic material which allows the insert end to collapse for insertion into the cylindrical housing. However, because of the elastic material and its associated Young's Modulus, upon insertion into the narrower open proximate end, the locking sleeve expands upon entry into the tapered section, causing the circumferential tab to come into engaging contact with the wall of the tapered section.

The locking sleeve has an opening which is configured to receive an end of an inserted pipe or conduit. An interior surface of the opening grips the pipe and withdrawal or pushing out of the pipe from the cylindrical housing is prevented as the locking sleeve radially collapses as it is pulled or pushed toward the smaller diameter of the internal tapered section. The locking sleeve may comprise a tubular band, with the tubular band having an inside surface which receives and grips the end of a pipe. The inside surface may have gripping structures.

An embodiment of the connector system may have a cylindrical interior cavity disposed between the open proximate end and the distal end, where the cylindrical interior cavity has an O-ring groove adjacent to the open proximate end, with an O-ring disposed in the O-ring groove. The O-ring will seal around the end of an inserted pipe or conduit.

An embodiment of the connector system may further comprise an undercut groove in the open proximate end of the cylindrical housing, where the undercut groove has an axial length which extends between a circumferential lip at the outward face of the open proximate end and a first circumferential shoulder adjacent to the O-ring groove. The first circumferential shoulder may separate the O-ring groove from the undercut groove. Moreover, in some embodiments the undercut groove comprises the tapered section. In some embodiments a locking ring may be disposed in the tapered section, where the locking ring is configured to encircle and grasp the end of the pipe. The cylindrical interior cavity has a maximum diameter which tapers to a minimum diameter. In one embodiment the minimum diameter is adjacent to the first circumferential lip and the maximum diameter is adjacent to the first circumferential shoulder. In another embodiment, the maximum diameter may be adjacent to the first circumferential lip and the minimum diameter adjacent to the first circumferential shoulder.

In another embodiment of the connector system, the locking sleeve may have an end-to-end axial slot, which increases the flexibility of the locking sleeve.

In another embodiment of the connector system which connects opposite facing ends of pipe, an internal tube may be disposed between the opposite facing ends of pipe.

In some embodiments of the invention, the distal end of the cylindrical housing may attach to a work piece. The work piece may be an opposite facing pipe, so that the connector system may be utilized to connect two adjacent lengths of pipe. Alternatively, the work piece may be a fixture or other device to which a delivery conduit is connected.

Embodiments of the present invention may be used to accelerate the installation of various devices without compromising the performance of the system. The locking structures of the present invention may be utilized to attach a variety of different components to a fluid delivery/receiving conduit, including additional lengths of conduit, faucets, heat exchangers, storage tanks, pump intakes, and other systems and devices which receive or discharge fluids. The typical application for embodiments of the present invention is one utilizing plastic pipe for the fluid delivery/receiving conduit.

DETAILED DESCRIPTION OF THE INVENTION

Figure 1:
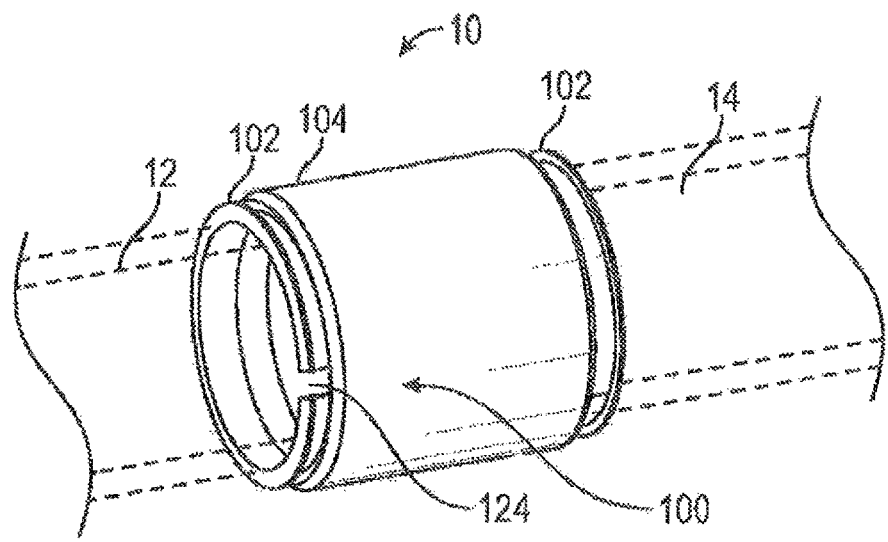
FIG. 1 depicts an isometric view of an embodiment of the disclosed connector being utilized to connect adjacent lengths of pipe.
Figure 2:
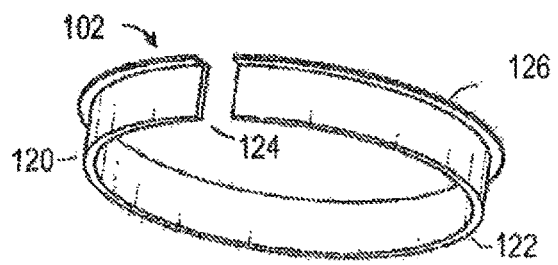
FIG. 2 depicts an isometric view of an embodiment of a locking sleeve.

Referring now to the figures, FIG. 1 depicts an embodiment of the disclosed connector 10 being utilized to connect pipe length 12 and a workpiece 14. As indicated in the figures, workpiece 14 may be an opposing length of pipe, where the connector is utilized to connect the two pipe lengths. However, it is to be appreciated that the workpiece may also be any one of several types of pipe fittings connected to pipe length 12. Alternatively, workpiece 14 may comprise one of several components, such as a faucet, header, pump, manifold, tank, or similar device.

Figure 3:
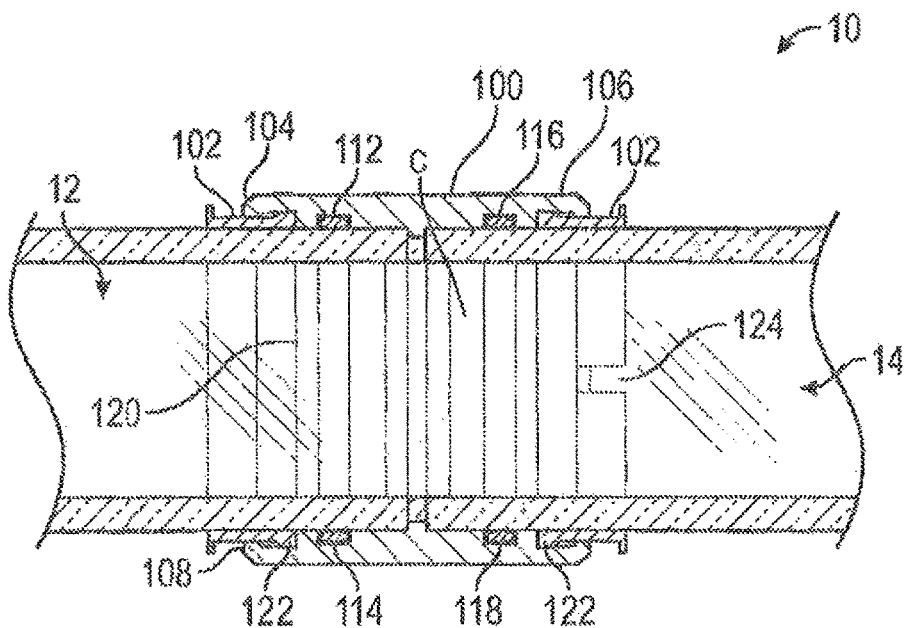
FIG. 3 is a lengthwise sectional view of the embodiment of the invention depicted in FIG. 1.

The embodiment of the connector 10 depicted in FIG. 1 has a cylindrical housing 100 with locking sleeves 102 which are partially inserted into the housing and engage the inside of the housing adjacent to open proximate end 104 and a distal end 106 of the cylindrical housing 100. Open proximate end 104 has an outward face 108. As shown in FIG. 3, cylindrical housing 100 may have a cylindrical interior cavity C contained within the inner wall 110 of the cylindrical housing, where the cylindrical interior cavity is disposed between the open proximate end 104 and the distal end 106. The cylindrical interior cavity C may have an O-ring groove 112 adjacent to the open proximate end 104, where an O-ring 114 is disposed within the groove. The cylindrical interior cavity C may have an O-ring groove 116 adjacent to the distal end 106 where an O-ring 118 is disposed in the groove. Cylindrical housing has a bore 140 which receives pipe length 12.

Figure 6:
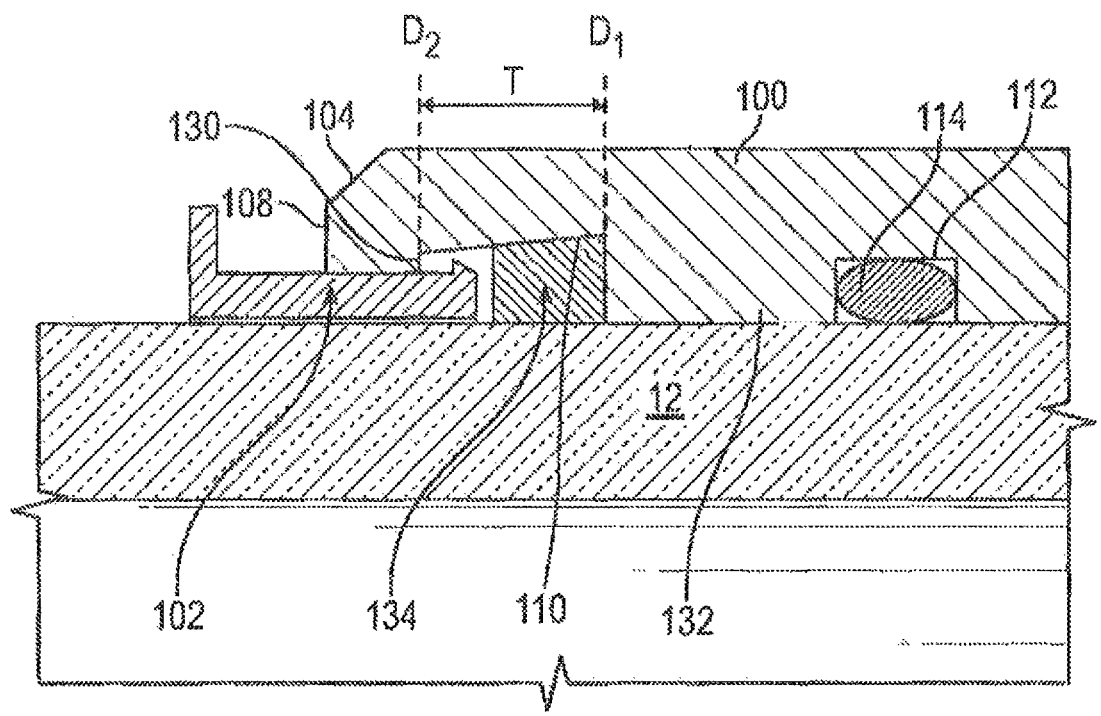
FIG. 6 is a detailed view of a locking ring set within a tapered section of the cylindrical housing.
Figure 7:
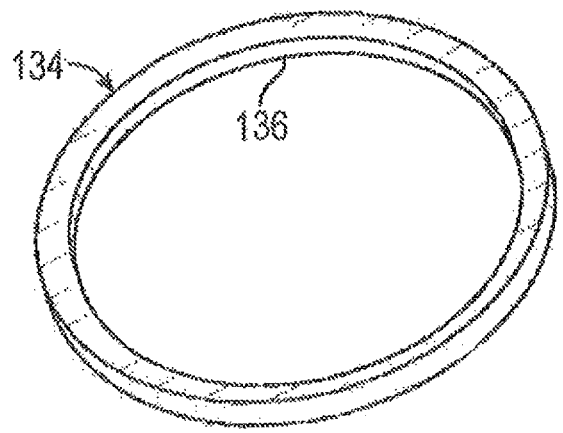
FIG. 7 depicts an isometric view of an embodiment of a locking ring.

As indicated in FIG. 6, cylindrical housing 100 may have an internal tapered section T where the cylindrical housing tapers from a larger internal diameter $D_1$ to a smaller internal diameter $D_2$. For the embodiment depicted in the Figures, the smaller internal diameter $D_2$ is adjacent to the open proximate end 104.

Locking sleeve 102 has an insert end 120. Insert end 120 has an inside circumferential tab 122 and an outside circumferential tab 126. The locking sleeve 102 in whole, or at least insert end 120, is fabricated from an elastic material which allows the insert end to be elastically collapsed for insertion into the cylindrical housing 100 and to expand so that the inside circumferential tab 122 comes into engaging contact with the inner wall 110 of the cylindrical housing, typically within the tapered section T. Locking sleeve 102 may have an internal diameter which is uniform except for an end-to-end axial slot 124, which interrupts the internal diameter and which provides additional flexibility to the locking sleeve. It is to be appreciated that for this embodiment, the "circumferential" tabs 122, 126 are interrupted by the end-to-end axial slot.

As shown in the figures, locking sleeve 102 has an opening which receives the end of pipe 12 and, for embodiments of the device used to connect lengths of pipe, the end of pipe 14. The ends of pipe 12, 14 are gripped by the respective locking sleeves 102 upon insertion of the ends of the pipe into bore 140 of connector 10. Withdrawal of the ends of pipe 12, 14 is prevented as the insert end 120 of the locking sleeve is radially collapsed as it is pulled toward the smaller internal diameter D2 adjacent to the open proximate end 104. If it is desired to release the Locking sleeve 102 may be fabricated from materials which have an elastic modulus which allows the above-described functionality such as various metals, alloys and plastics.

The cylindrical housing 100 may have various configurations which accomplish the functionality described above. In one embodiment, an internal tapered section T may be disposed adjacent to open proximate end 104, where the internal tapered section is defined by an undercut groove 128 which axially extends between a circumferential lip 130 at the outward face 108 and a first circumferential shoulder 132 at O-ring groove 112. In the embodiments depicted in the figures, the first circumferential shoulder 132 separates the O-ring groove 112 from the undercut groove 128. However, it is to be appreciated that the O-ring groove 112 may be located at different internal locations within the cylindrical interior cavity C. Distal end 106 may have a comparable internal tapered section as indicated in FIGS. 3-4.

FIG. 6 depicts an embodiment of the device which utilizes a locking ring 134 which is disposed in the internal tapered section T. Locking ring 134 is configured to encircle and grasp the end of pipe length 12. Withdrawal of the pipe 12 is prevented as the locking ring 134 is radially collapsed as it is pulled toward the smaller internal diameter D2 adjacent to the open proximate end 104. Removal of the pipe length 12 from connector 10 may be accomplished by pushing pipe 12 forward into the connector and pushing locking sleeve 102 forward, thereby pushing the locking ring 134 toward larger internal diameter D1. Locking ring 134 may have an inwardly facing surface 136 having gripping members, such as inwardly facing teeth, ridges, or similar structures. Positive engagement of the pipe length 12 or work piece 14 may further be increased by providing opposite facing gripping members on the exterior surfaces of the pipe length 12 or work piece 14, which gripping members engage the gripping members of the locking ring 134.

Figure 4:
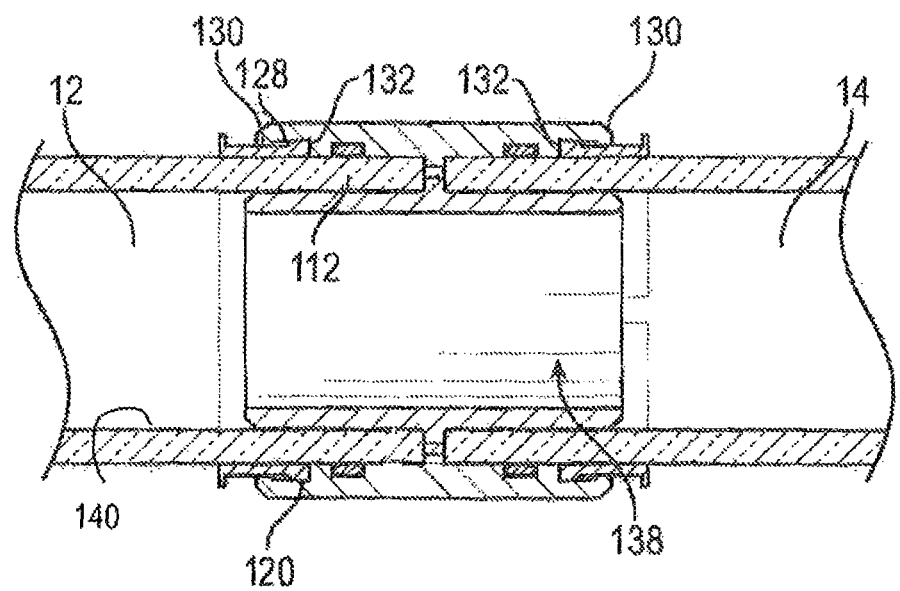
FIG. 4 is a lengthwise sectional view of an embodiment of the disclosed connector being utilized to connect adjacent lengths of pipe, wherein an internal tube is disposed between the end of the first pipe length and the second pipe length.
Figure 5:
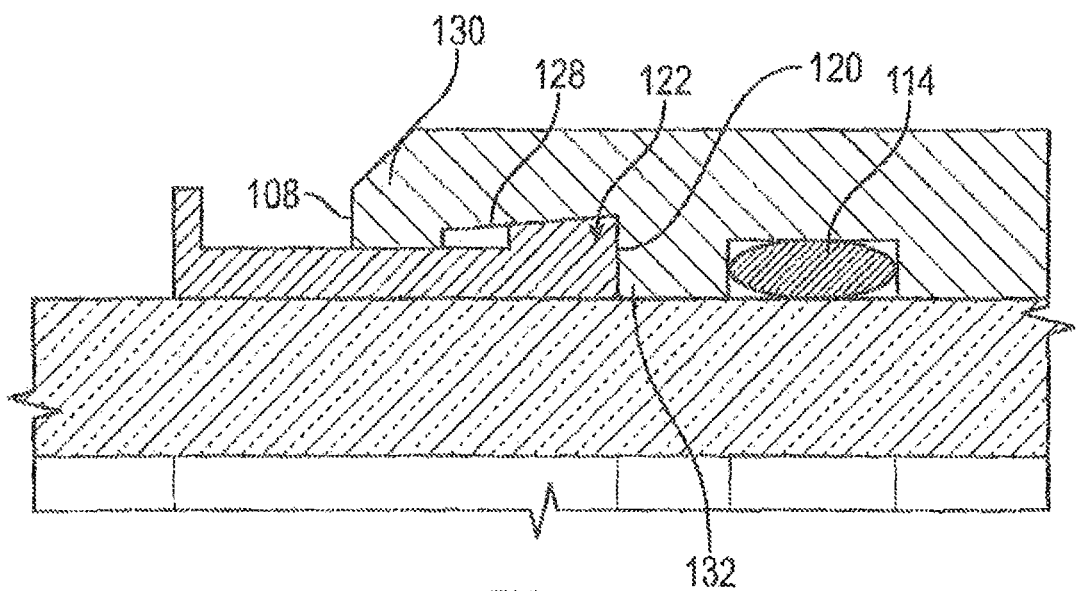
FIG. 5 is a detailed view of a circumferential tab of a locking sleeve disposed within a tapered section of a cylindrical housing.

FIG. 4 depicts an embodiment of the connector 10 which is being utilized to connect adjacent lengths of pipe with an internal tube 138 disposed between the end of the first pipe length 12 and the second pipe length 14.

Having thus described the preferred embodiment of the invention, what is claimed as new and desired to be protected by Letters Patent includes the following:

The invention claimed is:

1. A connector system comprising:
a cylindrical housing having an open proximate end and a distal end, the open proximate end comprising an outward face, the cylindrical housing comprising an internal tapered section, the tapered section tapering from a first larger diameter to a second smaller diameter, the smaller diameter adjacent to the open proximate end;
a locking sleeve having an inwardly facing wall, the locking sleeve comprising an insert end having an outwardly extending circumferential tab, the insert end fabricated from an elastic material which allows the insert end to collapse for insertion into the cylindrical housing and to expand so that the circumferential tab comes into engaging contact with an inside wall of the tapered section, the locking sleeve having an opening for receiving an end of a first pipe whereafter receiving the end of the first pipe the locking sleeve comprises an internal diameter from the insert end to the opening, wherein the internal diameter is uniform except for an end-to-end axial slot through the inwardly facing wall which interrupts the internal diameter, wherein the end of the first pipe is gripped by the locking sleeve and withdrawal of the pipe from the cylindrical housing is prevented as the insert end of the locking sleeve radially collapses as the locking sleeve is pulled toward the second smaller diameter of the internal tapered section.

2. The connector system of claim 1 further comprising a cylindrical interior cavity disposed between the open proximate end and the distal end, the cylindrical internal cavity comprising a first o-ring groove adjacent to the open proximate end, wherein a first o-ring is disposed in the first o-ring groove, the first o-ring for sealing around the end of the first pipe.

3. The connector system of claim 2 wherein the open proximate end comprises an undercut groove axially extending between a first circumferential lip at the outward face and a first circumferential shoulder adjacent to the first o-ring groove.

4. The connector system of claim 3 wherein the first circumferential shoulder separates the first o-ring groove from the first undercut groove.

5. The connector system of claim 4 wherein the first undercut groove comprises the tapered section.

6. The connector system of claim 1 wherein the distal end attaches to a workpiece.

7. The connector system of claim 6 wherein the workpiece comprises a second pipe having a second pipe end.

8. The connector system of claim 7 further comprising an internal tube disposed between the end of the first pipe and the second pipe end.

9. The connector system of claim 1 further comprising a locking ring disposed in the tapered section, the locking ring configured to encircle and grasp the end of the first pipe.

10. A connector system for attaching an end of an inserted first pipe to an opposite facing end of a workpiece, the connector system comprising:
   a housing having a proximate end configured to receive the end of the first pipe and a distal end configured to receive the opposite facing end of the workpiece, the proximate end comprising an outside facing first end and the distal end comprising an outside facing second end, the housing further comprising a cylindrical interior surface disposed between the proximate end and the distal end, the cylindrical interior surface enclosed by an internal wall of the housing and bound at the proximate end by a first o-ring groove and bound at the distal end by a second o-ring groove, wherein a first o-ring is disposed in the first o-ring groove, the first o-ring for sealing around the end of the inserted first pipe, and a second o-ring is disposed in the second o-ring groove, the second o-ring for sealing around the opposite facing end of the workpiece, the proximate end comprising a first undercut groove axially extending between a first circumferential lip at the outside facing first end and a first circumferential shoulder adjacent to the first o-ring groove, the distal end comprising a second undercut groove axially extending between a second circumferential lip at the outside facing second end and a second circumferential shoulder adjacent to the second o-ring groove;
   a proximate end locking sleeve comprising a tubular band having a inwardly facing wall having an internal opening which receives the first end of the inserted first pipe, the proximate end locking sleeve further comprising an outside circumferential tab and an inside circumferential tab, the inside circumferential tab compressible to allow insertion of the inside circumferential tab into the proximate end of the housing, wherein the first circumferential tab is expandable thereby locking the inside circumferential tab into the first undercut groove with the outside circumferential tab abutting the outside facing first end, whereafter receiving the first end of the inserted first pipe the locking sleeve comprises an internal diameter, wherein the internal diameter is uniform except for an end-to-end axial slot through the inwardly facing wall which interrupts the internal diameter, from the outside circumferential tab to the inside circumferential tab, the proximate end locking sleeve thereby securing the first end of the inserted first pipe within the housing with the first end disposed within the first o-ring; and
   a distal end locking sleeve comprising an outward circumferential tab and an inward circumferential tab, the inward circumferential tab compressible to allow insertion of the inward circumferential tab into the distal end and expandable thereby locking the inward circumferential tab into the second undercut groove with the outward circumferential tab abutting the outside facing second end, the distal end locking sleeve thereby securing the opposite facing end of the workpiece within the housing with the opposite facing end disposed within the second o-ring.

11. The connector system of claim 10 wherein the workpiece comprises an end of a second pipe.

12. The connector system of claim 10 wherein the distal end locking sleeve comprises an end-to-end axial slot.

13. A connector system for attaching an end of an inserted first pipe to a workpiece, the connector system comprising:
   a housing having an interior surface and a proximate end configured to receive the end of the first pipe and a distal end configured to attach to the workpiece, the proximate end comprising an outside facing first end, the housing further comprising a cylindrical interior cavity disposed between the proximate end and the distal end and bound by the interior surface, the proximate end further comprising a first undercut groove axially extending between a first circumferential lip at the outside facing first end and a first circumferential shoulder extending into the cylindrical interior cavity, wherein the diameter of the first undercut groove with respect to interior surface tapers between the first circumferential lip and the first circumferential shoulder, defining a first tapered section;
   a proximate end locking sleeve comprising a tubular band having an inwardly facing wall, the proximate end locking sleeve comprising an outside circumferential tab and an inside circumferential tab, the inside circumferential tab compressible for insertion into the proximate end and expandable so that the inside circumferential tab comes into engaging contact with the first tapered section with the outside raised ring abutting the outside facing first end, the proximate end locking sleeve further comprising an inside surface which receives and grips the end of the first pipe thereby securing the end of first end of the inserted first pipe within the housing whereafter receiving the end of the first pipe the locking sleeve comprises an internal diameter, wherein the internal diameter is uniform except for an end-to-end axial slot through the inwardly facing wall which interrupts the internal diameter, from the outside circumferential tab to the inside circumferential tab.

14. The connector system of claim 13 wherein the first tapered section comprises a maximum diameter adjacent to the first circumferential shoulder and a minimum diameter adjacent to the first circumferential lip.

15. The connector system of claim 14 wherein axial movement of the first pipe toward the outside facing first end causes the inside circumferential tab to be pulled toward the minimum diameter of the first tapered section thereby resisting axial movement of the first pipe toward the outside facing first end.

16. The connector system of claim 13 wherein the cylindrical interior cavity has a wall, wherein the wall comprises a first o-ring groove adjacent to the proximate end wherein the wall comprises a first o-ring groove adjacent to the proximate end wherein a first o-ring is disposed in the first o-ring groove.

17. The connector system of claim 13 wherein the workpiece comprises a second pipe having a second end.

18. The connector system of claim 13 wherein the first circumferential shoulder separates the o-ring groove from the first undercut groove.

19. The connector system of claim 13 further comprising a locking ring disposed in the first tapered section, the locking ring configured to encircle and grasp the first end of the first pipe.

20. The connector system of claim 19 wherein the locking ring comprises an inwardly facing surface comprising a first plurality of gripping members.

21. The connector system of claim 20 wherein the first end of the inserted first pipes comprises a surface comprising a second plurality of gripping members which engage the first plurality of gripping members upon movement of the inserted first pipe fo further inhibit withdrawal of the inserted first pipe.

* * * * *